US011745654B2

(12) United States Patent
Godsey et al.

(10) Patent No.: US 11,745,654 B2
(45) Date of Patent: Sep. 5, 2023

(54) METHOD AND APPARATUS FOR OBJECT ALERT FOR REAR VEHICLE SENSING

(71) Applicant: Metawave Corporation, Carlsbad, CA (US)

(72) Inventors: Sandra Lynn Godsey, Carlsbad, CA (US); Kaice Theodore Reilly, San Diego, CA (US)

(73) Assignee: Metawave Corporation, Carlsbad, CA (US)

( * ) Notice: Subject to any disclaimer, the term of this patent is extended or adjusted under 35 U.S.C. 154(b) by 95 days.

(21) Appl. No.: 17/102,158

(22) Filed: Nov. 23, 2020

(65) Prior Publication Data

US 2021/0155157 A1 May 27, 2021

Related U.S. Application Data

(60) Provisional application No. 62/939,129, filed on Nov. 22, 2019.

(51) Int. Cl.
*B60Q 9/00* (2006.01)
*G01S 17/931* (2020.01)

(52) U.S. Cl.
CPC ............ *B60Q 9/008* (2013.01); *G01S 17/931* (2020.01)

(58) Field of Classification Search
CPC ....... B60Q 9/005; B60Q 9/008; G01S 13/931; G01S 13/867; G01S 17/931; G01S 2013/93272; G01S 2013/9315
USPC .......................................................... 348/148
See application file for complete search history.

(56) References Cited

U.S. PATENT DOCUMENTS

| 2012/0062743 A1* | 3/2012 | Lynam ................. G05D 1/0061 |
| | | 348/148 |
| 2014/0204215 A1* | 7/2014 | Kriel ..................... G01S 13/931 |
| | | 342/52 |
| 2019/0250264 A1* | 8/2019 | Belfiore .................. G01S 7/282 |
| 2019/0258878 A1* | 8/2019 | Koivisto .............. G06V 10/762 |
| 2019/0265714 A1* | 8/2019 | Ball ....................... G05D 1/0221 |
| 2019/0333232 A1* | 10/2019 | Vallespi-Gonzalez ...................... |
| | | G06N 20/00 |

* cited by examiner

*Primary Examiner* — Thai Q Tran
*Assistant Examiner* — Nienru Yang

(57) ABSTRACT

A system and method for a vehicle sensor that maps radar detected targets as target alerts overlaid on a display image.

20 Claims, 7 Drawing Sheets

METHOD AND APPARATUS FOR OBJECT ALERT FOR REAR VEHICLE SENSING

CLAIM OF PRIORITY

This application claims priority from U.S. Provisional Application No. 62/939,121, titled "METHOD AND APPARATUS FOR OBJECT ALERT FOR REAR VEHICLE SENSING," filed on Nov. 22, 2019, and incorporated herein by reference in its entirety.

BACKGROUND

On dark and stormy nights, vehicle operators have difficulty understanding the environment, including images presented on an in-vehicle monitor display of a rear camera. This 121unsafe situation leads to accidents and deaths. Each year, hundreds of children are killed and injured when cars back into them. Essentially invisible to the driver due to their small size and proximity to the ground, rear sensors fail to identify all locations, in particular those closest to the road.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

The present inventions are applicable to a rearview video system (RVS), also referred to as a backup camera. An RVS is a safety technology to prevent crashes referred to as "backover crashes" and protect people, particularly children and the elderly. The RVS provides an image of the area behind the vehicle to assist the driver in control of the vehicle and avoidance of accidents. The RVS presents the area behind the vehicle in a display visible to the driver. The field of view for an RVS is typically designed to provide visibility of the rear field of view. The driver is then able to avoid hitting walls, vehicles, and other obstacles, as well as people and animals. The rear field of view of a camera is determined by the field of view of the camera, which is typically pointed on a downward angle to view obstacles on the ground and those directly behind the vehicle.

Figure 1:
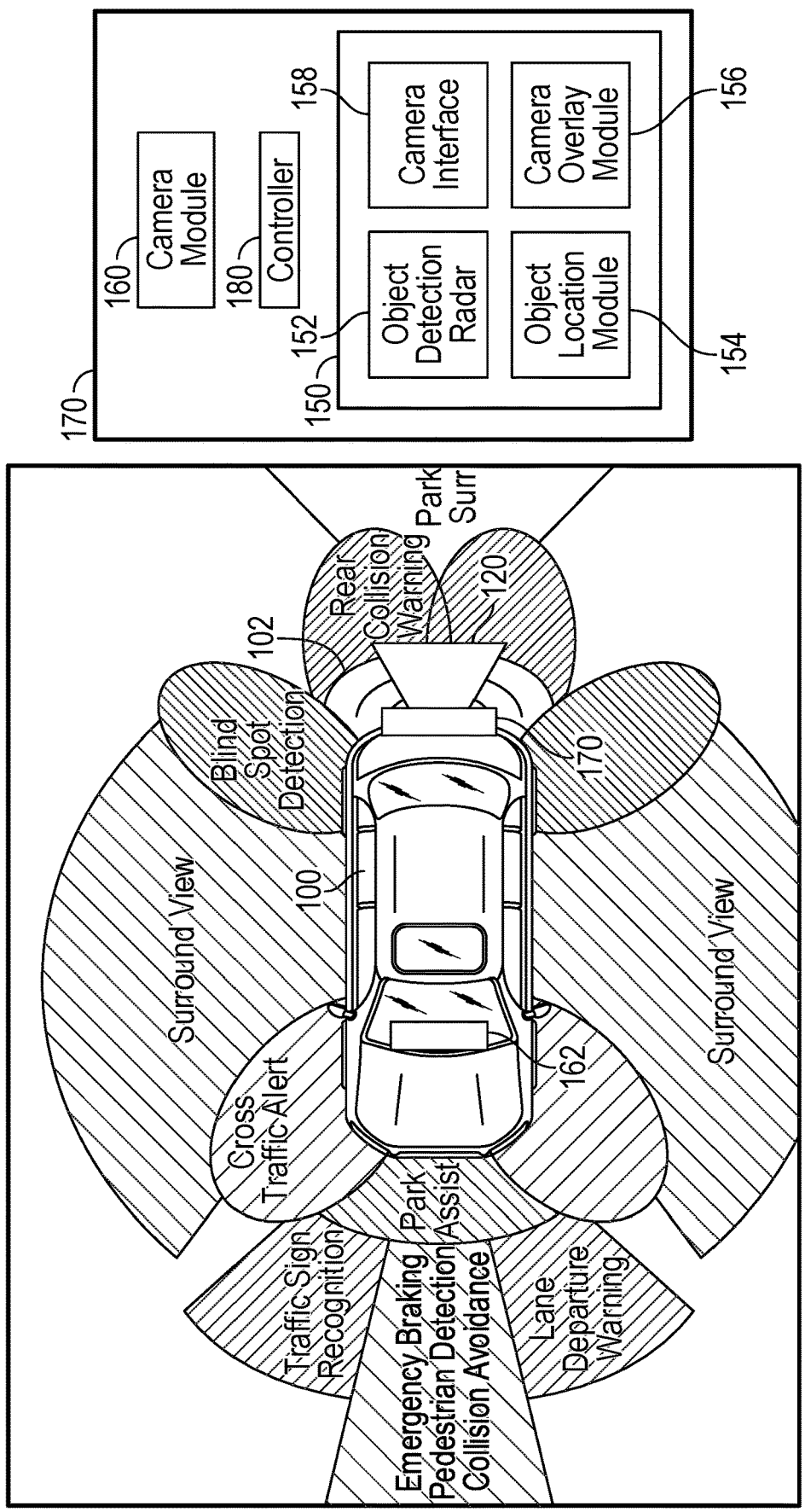
FIG. 1 illustrates a vehicle and a rear sensor module, according to embodiments of the present inventions and subject technology.

FIG. 1 illustrates a vehicle 100 having a rear sensor system 170 positioned on the rear of the vehicle 100 to provide visibility to the rear area of the vehicle. The rear sensor system 170 includes a camera unit 160 having a rear camera field of view (RCFV) 102 and an object detection radar unit 152 having a rear radar field of view (RRFV) 120. The RCFV 102 and the RRFV 120 may cover a same area or may be cover overlapping and/or different areas. These sensors are designed to provide a full view of the rear of the vehicle 100. The camera module 160 captures images of the RCFV The object detection radar unit 152 complements the camera module 160 by detecting objects within the RCFV 102 and providing the location of detected objects as an overlay to the camera information that is presented on a rear camera display 162 located in the vehicle.

The object rear sensor system 150 further includes radar overlay unit 150 includes the object detection radar unit 152 to detect objects, an object location module 154 that maps the detected object to a location in the RCFV 102, a camera overlay module 156 for providing the location information for overlay on the image presented to the driver on the display 162, and a camera interface unit 158. The radar overlay unit 150 interfaces with a camera sensor 160 and a controller 180. The rear sensor system 170 is coupled to, or part of, a sensor fusion control that merges data from the multiple sensors to assist in vehicle navigation.

Figure 2:
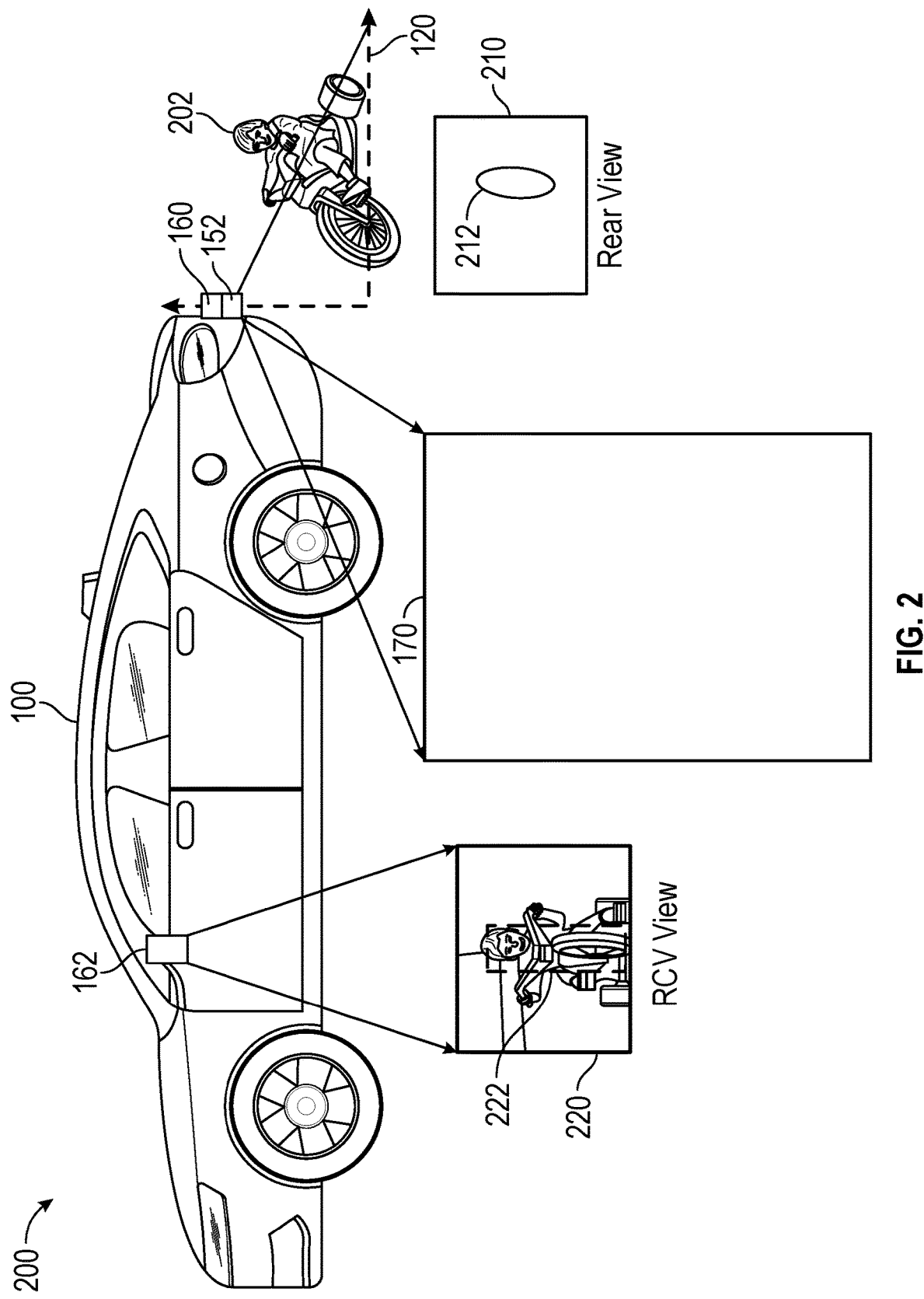
FIG. 2 illustrates the vehicle of FIG. 1 with the rear sensor module coverage area identified, according to embodiments of the present inventions and the subject technology.

FIG. 2 illustrates a scenario 200. A side view of vehicle 100 illustrates a placement of RCV display 162 proximate the driver's seat, placement of object detection radar 152 at the rear of the vehicle 100 and camera 160 also at the rear of the vehicle 100. The sensor locations are designed to provide visibility to areas difficult for the driver to see, such as the area behind the vehicle. In the present embodiment, both the camera 160 and the object detection radar 152 operate concurrently. As a radar target, such as an object, person, animal, trees and other vegetation, infrastructure and so forth, may be behind the vehicle the object detector rear 152 of sensor system 150 detects the target and provides alert information to the camera module 160 for display on RCV display 162. Video captured by camera 160 sends information to RCV display 162 to display in real time for the driver and is part of an Automated Driver Assist System (ADAS).

In the scenario of FIG. 2, a child 202 is the radar target riding behind vehicle 100. The object detection radar 152 detects the target and target information, which includes the range to the target; in some embodiments the target information includes the Radar Cross Section (RCS) size, velocity, and other parameters. With this target information, the object location module 154 maps at least a portion of the target information, or an indication therefrom, to the camera overlay module 156. The target information is mapped and coordinated with the camera information by controller 180 and/or camera module 160 with information shared through camera interface 158.

In the illustrated scenario 200, the RCV display 162 is illustrate with the image of child 202. A target alert 222 is positioned over the image of child 202 in a manner that contrasts with the image. Here the target alert 222 is a white box surrounding the target. Alternate embodiments may use other types of alerts including a different color, shape, and contrast level. In some embodiments, the target alert 22 is a flashing box to capture the driver's attention.

Figure 3:
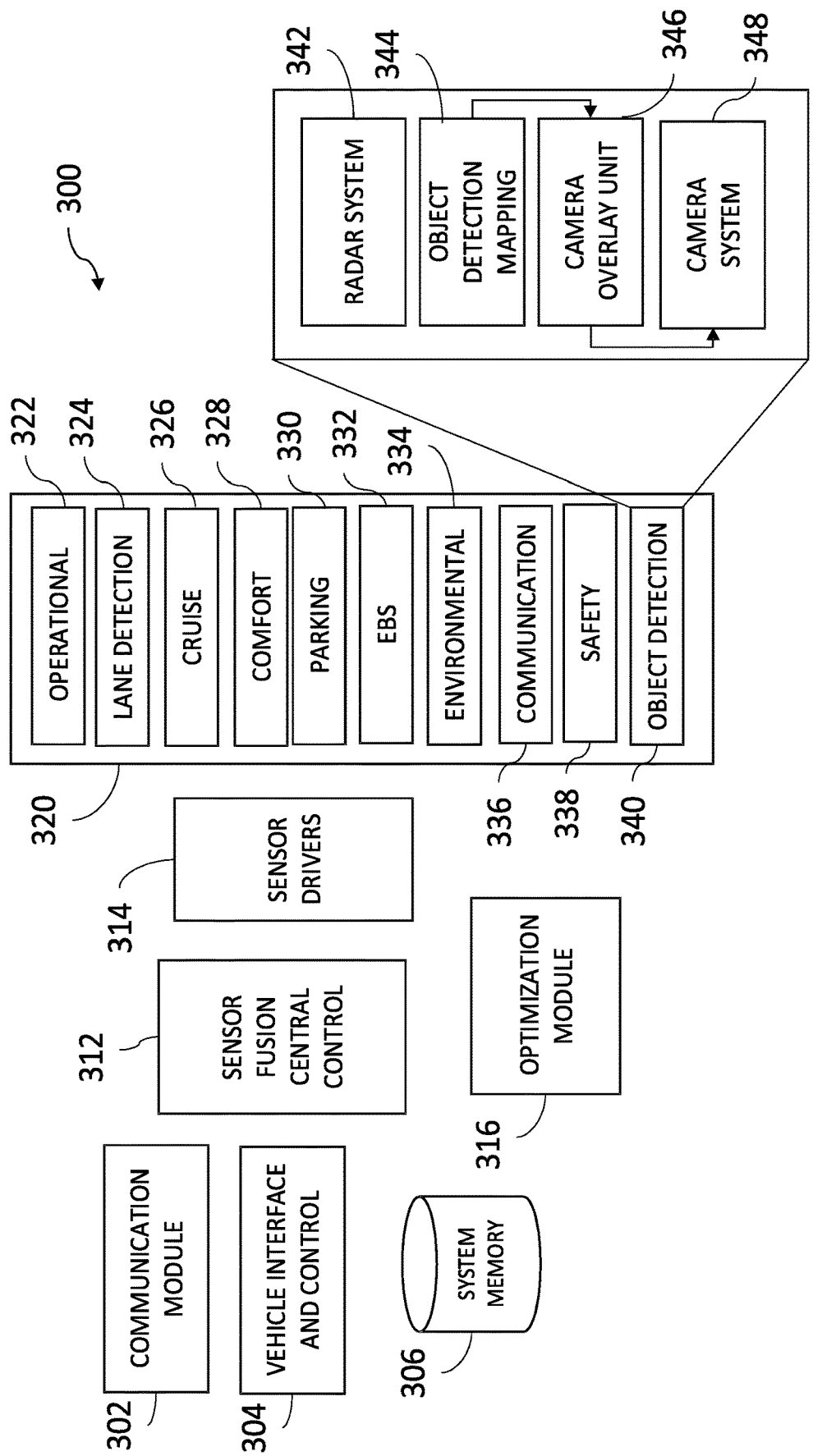
FIG. 3 illustrates a block diagram drawing of functional components of a sensor fusion control module for a vehicle, according to embodiments of the present inventions and the subject technology.

FIG. 3 is a block diagram of the various components of a sensor fusion system 300, according to some embodiments of the present inventions. A sensor fusion central control 312 receives information from the sensors and detection modules 320 including operational, environmental, safety and so forth. In the present embodiments, modules 320 includes an operational sensor 322 providing information on movement of the vehicle, condition of the vehicle, and location of the vehicle. Lane detection sensor 324 is part of the ADAS and gives the driver one or more indications of moving objects around the vehicle. Cruise, parking, and comfort modules 326, 330, 328 provide options to the driver and passengers for easier driving and or temperature comfort and so forth. Other sensors, such as Emergency Braking System (EBS) 332 and other safety sensors 338 override the driver's control in specific situations to avoid accidents, damage and injury. Environmental sensor(s) 334 provide information to the sensor fusion central control 312, specific functional areas of the vehicle and/or the driver as to conditions outside the vehicle, such as rain, temperature, and so forth. Communication module 336 receives over-the-air signals that provide information to the vehicle, such as alerts from other vehicles and interfaces with applications, such as a driving apps that provide directions, live traffic maps, road alerts, alternate routes and helps the driver navigate.

Sensors 320 includes an object detection module 340 that includes a rear object detection capability in addition to other detection areas and methods. The object detection module 340 includes radar system 342, object detection mapping 344, camera overlay unit 346 and a camera system 348. The object detection module 340 may include other modules, functions, operations and capabilities in addition to those in the block diagram of FIG. 3. The radar system 342 has a radar beam scan capability operational at a frequency to enable real time reaction by the vehicle or driver.

The sensor fusion system 300 also includes sensor driver 314 for implementation of control from sensor fusion central control 312 and optimization module 316. This allows the sensor fusion system 300 to use information from one sensor to enable or control the operation of another sensor. The optimization module 316 may be a machine learning module or may operate on specific algorithms. The sensor fusion system 300 also includes a communication module, vehicle interface and control 304, and system memory 306. The sensor fusion system 300 communicates with other modules in the vehicle through communication module 302, such as to implement an action or to give guidance to the driver. The communication module 302 may also enable vehicle to vehicle communications, vehicle to infrastructure and networks, such as an Internet of Things (IoT) network, and sharing of information, downloads from a multicast or broadcast message, and so forth.

Figure 4:
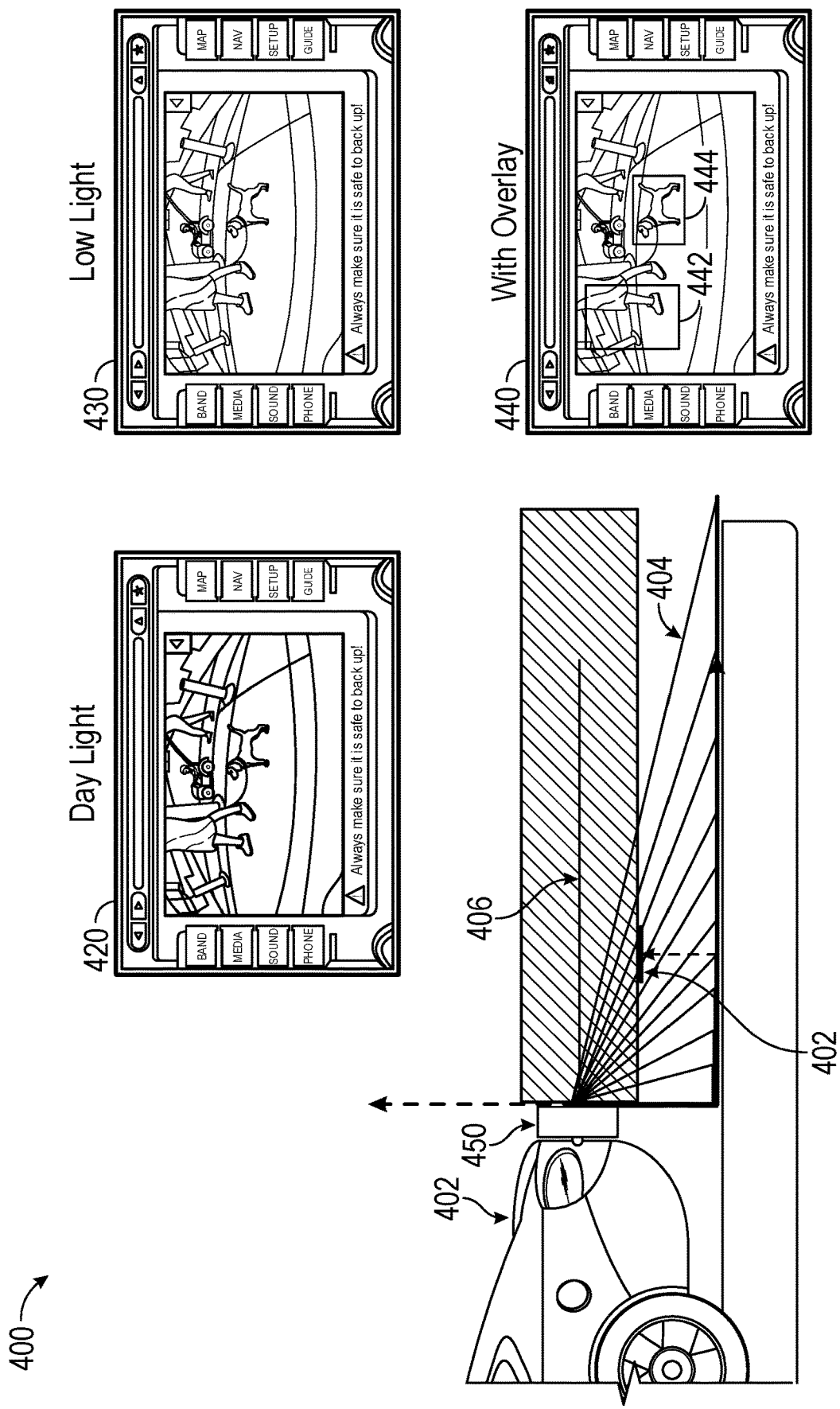
FIG. 4 illustrates a vehicle with a rear sensor module and the coverage area and target threshold level identified and mapped to a display module, according to embodiments of the present inventions and the subject technology.

FIG. 4 illustrates another aspect of the present inventions and illustrates a scenario 400 having a vehicle 402 with a rear sensor system 450 having a camera and radar modules (not shown). The rear sensor system 450 sends radar signals in the areas 404, scanning vertically. The radar signals may also scan horizontally. The radar signals are designed to detect objects behind the vehicle 402. In the present example, a daylight image 420 shows a man and a small dog. In low light, that same scene would not be as visible, such as in the low light image 430. This is often the situation in the evening or during a rainy or gloomy day. The rear sensor system 450 detects the objects, identifies location and overlays target alerts 442, 444 to the video image. As illustrated in display 440, where the low light reduces the contrast between the environment and the targets. This enhances the ADAS capabilities of the vehicle ensuring the driver is alerted to the targets, in this case a man and dog.

Figure 5:
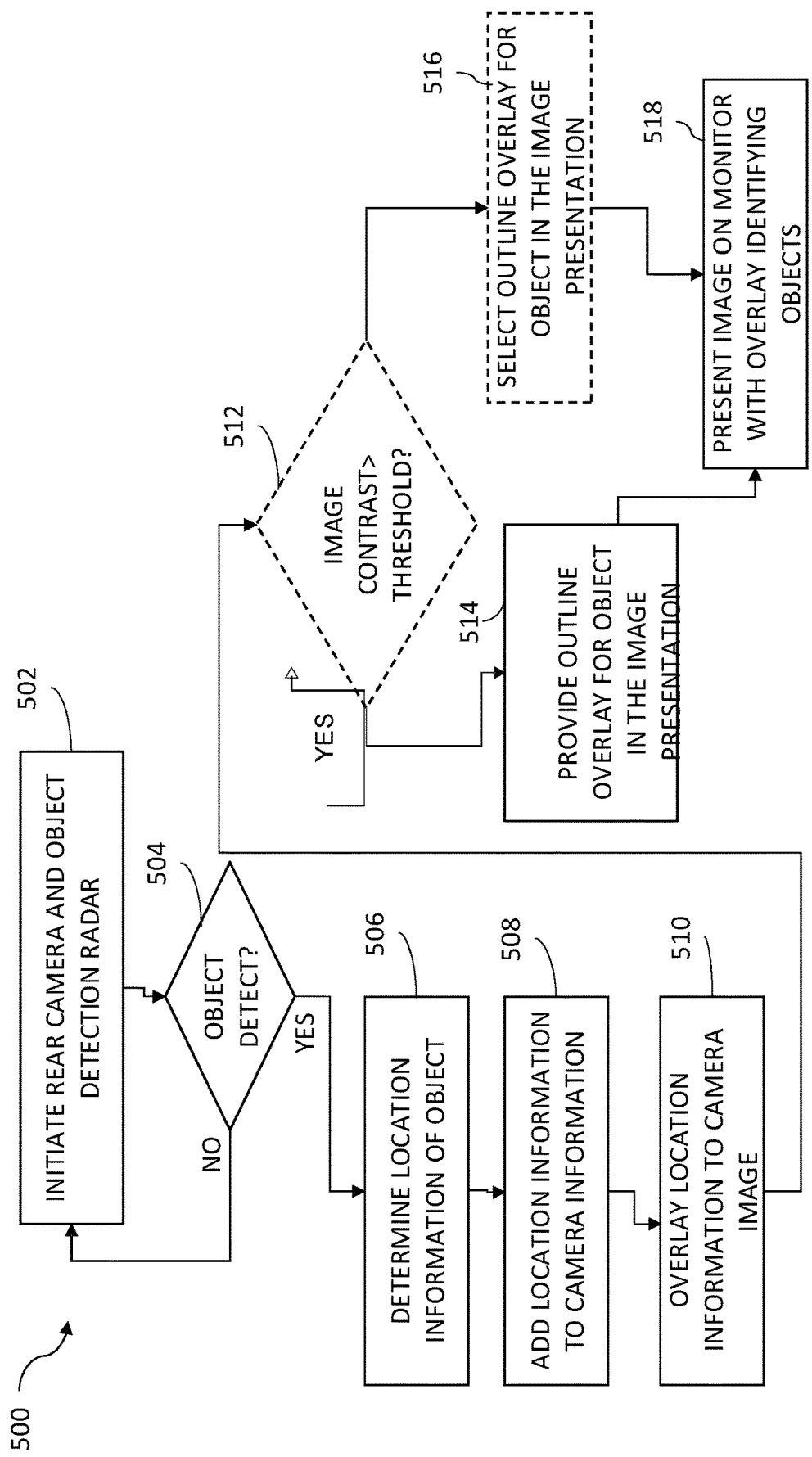
FIG. 5 is a flow chart of operation of a rear sensor system, according to embodiments of the present inventions and the subject technology.

Operation of a rear sensor system according to example embodiments is illustrated in FIG. 5 The process 500 first initiates, or continues operation of, a rear camera and object detection radar 502, where the radar is positioned to detect areas behind and/or beside a vehicle that may be difficult for the driver to detect. The radar acts to enhance operation of the camera, which may not operate as fully in dark lighting, bad weather and other conditions that may impair the visibility provided by the camera. By combining multiple sensors, various types of sensors, redundancy and so forth, allows real time generation of target alerts not typically available in current systems. If the rear sensor system detects an object, 504, the system then determines a location of the object and generates location information usable in the system, 506. The location information is combined with the camera information, 508 such that a target alert overlays placed to the camera image, 510, according to the location information. This information is provided to the video system, 514 and presented with the camera image, 518. This is an effective merging of radar and video data to make a more significant alert for the driver. There are a variety of application, where the information may be compared to the time of day or visibility in the current vehicle position and the alert is provided as an audible signal, a visual signal on the video screen or other display, a haptic signal on the steering wheel or other handle in the vehicle.

Some systems may also select an outline overlay or other target alert having sufficient image contrast, 512, 516, such as to change the color, size of the box, other type of overlay or other alert. In this way, if the child in the prior example has a white jacket but the lighting or visibility is low, then the system may overlay an image of a child; if the child is wearing a dark colored jacket there may be a red box or a flashing alert as the ability for the driver to detect the user is below a level considered safe. This may be the contrast of colors in the camera view or a visibility range of the camera, or other method to make it difficult to distinguish a radar target within the field of view. In this way, the radar data is matched to the image data to compare specific target locations. In some embodiments the alert signal flashes to ensure the driver's attention. In some embodiments, action is taken when the vehicle will collide or otherwise cause a dangerous situation, where this information may be provided to the sensor fusion or to a local edge computing controlled action. This may be the case when a child is just behind the car in a dark outfit and the lighting is poor; here the system would identify the child on the camera video in the vehicle so that the driver realizes there is an object, which in this case in a child. The system them provides the outline overlay for image presentation 514 and then presents the image on the RVC display of the vehicle with the overlay identifying the object(s), 518.

Figure 6:
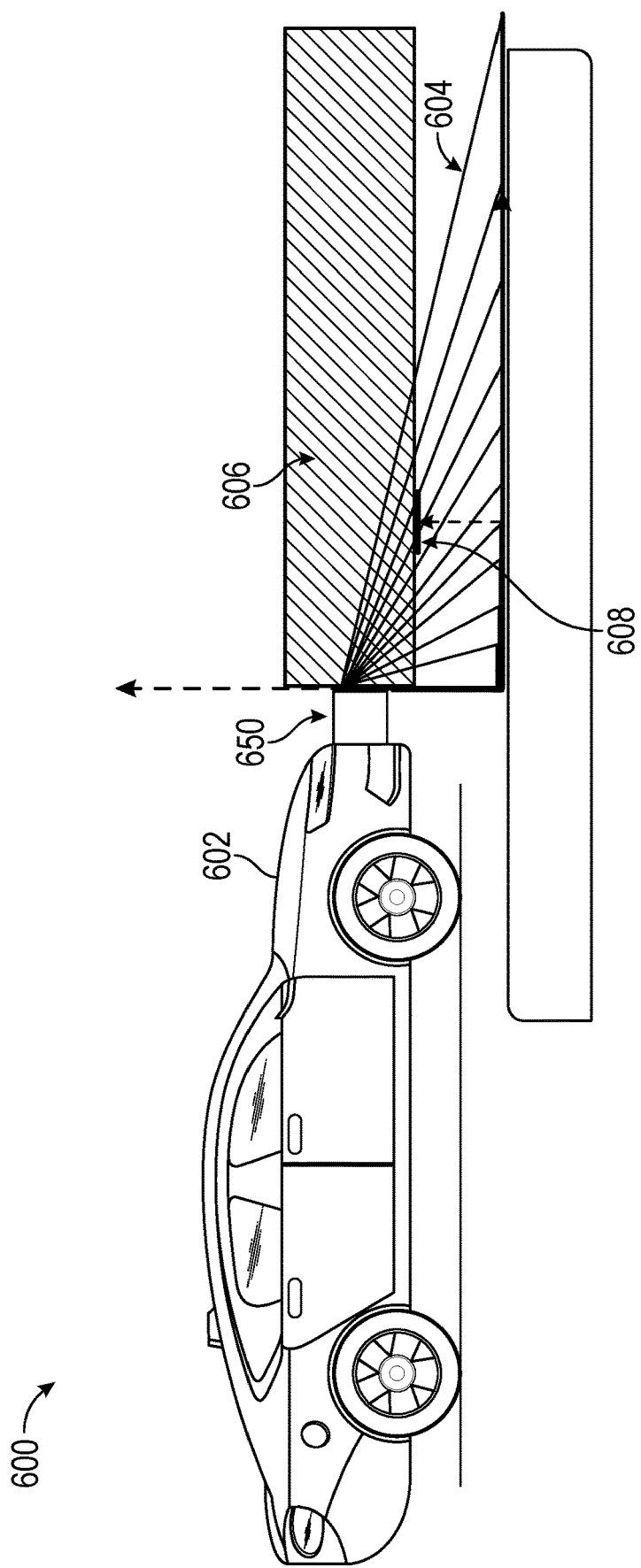
FIG. 6 illustrates a sensor system capable for proximate detection, according to embodiments of the present invention and the subject technology.

FIG. 6 illustrates a vehicle 600 having a sensor system 650 according to some embodiments, which is operational on the front of a vehicle. The sensor system 650 includes camera functionality and radar functionality for car 602. In the scenario 600, the vehicle is moving forward and the radar creates a field of view 604 as indicated, scanning in the vertical direction and in a horizontal direction to provide angular resolution sufficient to detect and distinguish objects in the path of the vehicle. As illustrated, there is a threshold 608 in the vertical direction corresponding to a first threshold, such as 20 cm in the vertical direction. The radar portion of the sensor system 650 is designed to detect any targets above the first threshold 608 which provides guidance to distinguish clutter from signal and a real target.

Figure 7:
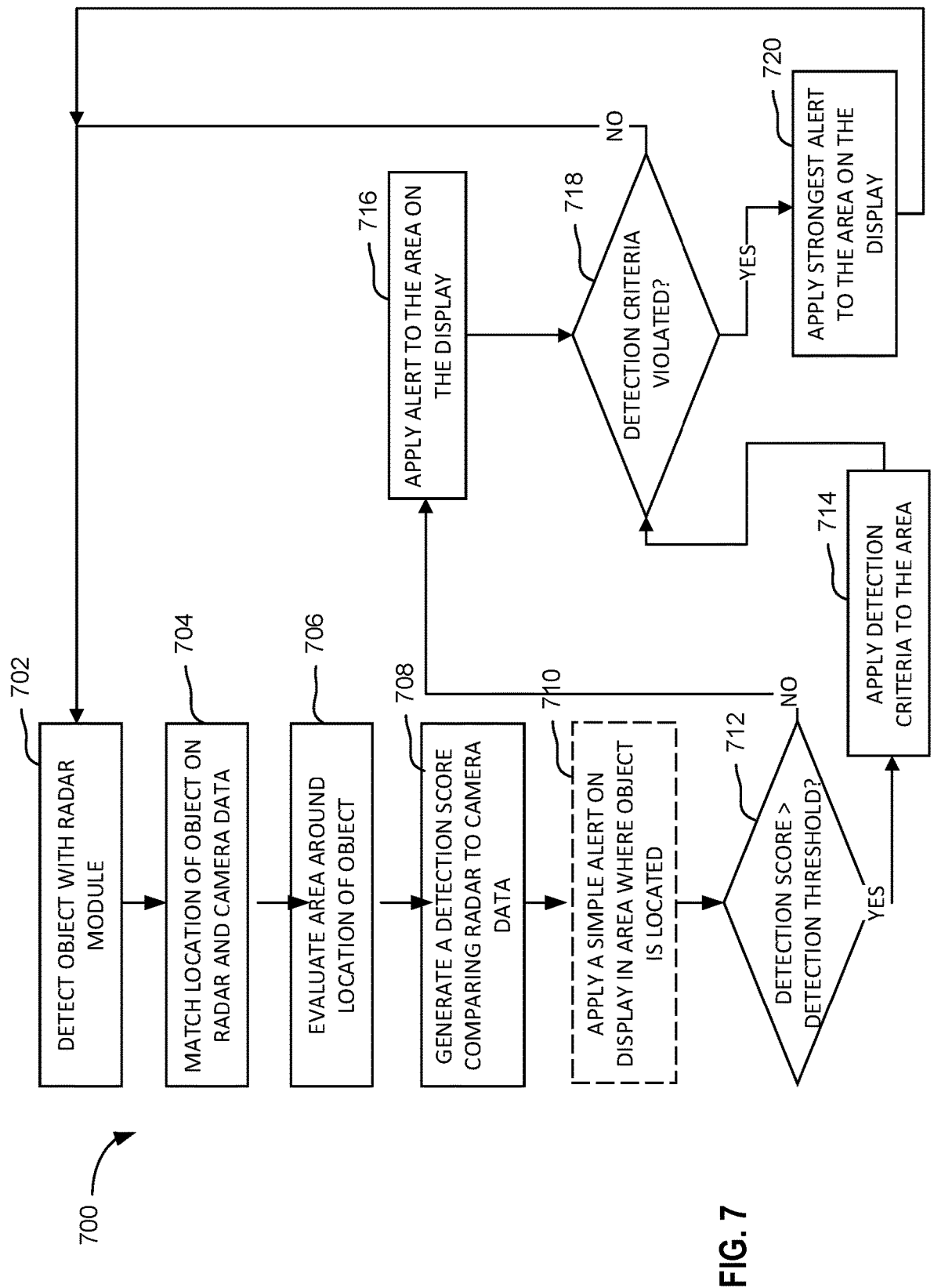
FIG. 7 illustrates an alert process for a sensor system.

FIG. 7 is a flow chart of the alert process 700 for a sensor system according to embodiments of the present invention. This process 700 continues in parallel with the camera video operation. On detection of an object with the radar module, 702, the object location is matched to the camera data, which is an effective mapping of information from the radar to the camera data. The system then evaluates sensed information from around the object; this area may be a predetermined size or may be a function of the size and movement of the object detected. For a child, this may be a smaller area than for a bicycle in motion. The system then generates a detection score by comparing radar data to camera data, 708. The detection score determines if the area evaluated is visible to the driver as a camera image. If the area and object blend into the scene and are not sufficiently distinguishable, then the detection score is low; if detection is easy, such as a strong contrast between the object and the area around the object, then the score is high. If the detection score is greater than the detection threshold, 712, then the system may apply a secondary detection criteria to the area. This criteria may identify weather conditions, the time of day, or other parameters, which are evaluated to see that they are as specified. For example, the camera data may be weighted higher on a sunny day than on a cloudy night. The weighting helps the system to determine the accuracy and importance of the camera data over other sensors. If the detection criteria is not violated, 718, then processing returns to continue monitoring, 702. If the detection score is greater than the detection threshold, 712, then the system applies an alert to the area of the object ton the display. This may be a box surrounding the area, an audible alarm, a flashing alarm and so forth, depending on the system, vehicle, location, object and so forth. If the detection criteria is not violated, processing continues to monitor for objects, 702.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A sensor system, comprising:
   a vehicle camera system adapted to present captured images on a display;
   a radar system, comprising at least one processor for performing:
   scanning a field of view to detect objects;
   detecting a first object in the field of view during a first time period;
   generating radar data for the first object;
   receiving camera data captured by the vehicle camera system during the first time period for at least a portion of the field of view; and
   generating a detection score by comparing the radar data to the camera data, wherein the detection score indicates if the object is visible in the camera data; and
   a control module to evaluate the detection score to determine if the first object is not visible to the vehicle camera system;
   an overlay module to map objects detected by the radar system, and not visible to the vehicle camera system, to a displayed image from the vehicle camera system, wherein the overlay module modifies the displayed image to include an indication of the first object.

2. The sensor system as in claim 1, wherein the control module is further adapted to provide a target shape on the display.

3. The sensor system as in claim 2, wherein the vehicle camera system comprises a rearview video camera.

4. The sensor system as in claim 3, wherein the vehicle camera system comprises a camera and a display to display the images including overlaid target shapes.

5. The sensor system as in claim 4, wherein the control module is further adapted to present a target alert to a user, wherein the target alert is positioned proximate a target shape so as to contrast with the image.

6. The sensor system as in claim 2, wherein the control module provides a detection score to a first target detected by the radar system at a first location, wherein the detection score determines when the target is visible a driver without an overlaid target.

7. The sensor system as in claim 6, wherein the control module identifies a first area around the first location.

8. The sensor system as in claim 1, wherein the sensor system has a set of rules and criteria associated with operation of the sensor system, wherein a first criteria is time of day, weather conditions.

9. The sensor system as in claim 8, wherein the sensor system uses the set of rules and criteria to assign a detection weight to each sensor.

10. The sensor system as in claim 9, wherein the sensor system applies information from each sensor based on the detection weight when forming the image for display.

11. The sensor system as in claim 10, wherein the detection weight is a function of visibility of each sensor.

12. The sensor system as in claim 1, wherein the radar system generates radar data identifying a radar cross section of a target, wherein the overlay module positions an overlay shape corresponding to the radar cross section of the target on the image displayed by the video, and wherein the overlay shape has an image contrast to distinguish the overlay shape within the image displayed.

13. A method for detection objects, comprising:
monitoring an area with a camera module generating camera data;
detecting a first object with a radar module generating radar data;
comparing the radar data and the camera data to generate a detection score;
evaluating the detection score to determine if the first object is visible to the camera module;
if the detection score indicates the first image is not visible to the camera module, then overlaying the radar data onto the camera data to form a combined data image; and
providing the combined data image to a display.

14. The method of claim 13, further comprising:
evaluating an area around a first location of the first object; and
generating a detection score for the first location by comparing the radar data to the camera data.

15. The method of claim 14, further comprising:
applying an alert to the combined data image that contrasts with the displayed image.

16. The method of claim 15, further comprising:
applying a detection criteria to the first area;
determining if the criteria is violated; and
applying a stronger alert to the combined data image when the criteria is violated.

17. The method of claim 16, wherein the detection criteria is from the set of rules and criteria.

18. The method of claim 17, wherein detection criteria is the light conditions in the first area.

19. A sensor system operating as in claim 16.

20. The sensor system as in claim 19, wherein the sensor system is positioned at the rear of a vehicle camera system.

* * * * *